R. B. Wheatley
Setting Tires
Nº 75713.  Patented Mar. 17, 1868.
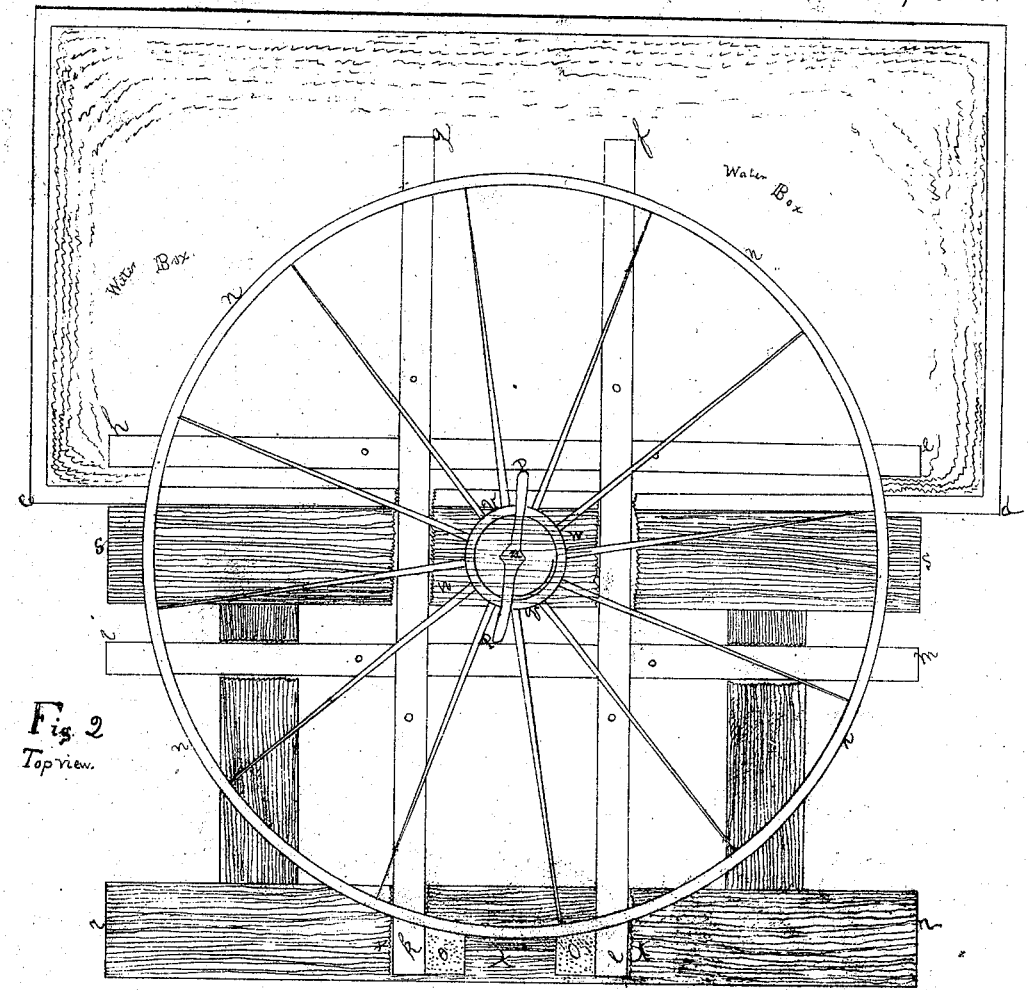
Fig 2
Top view.
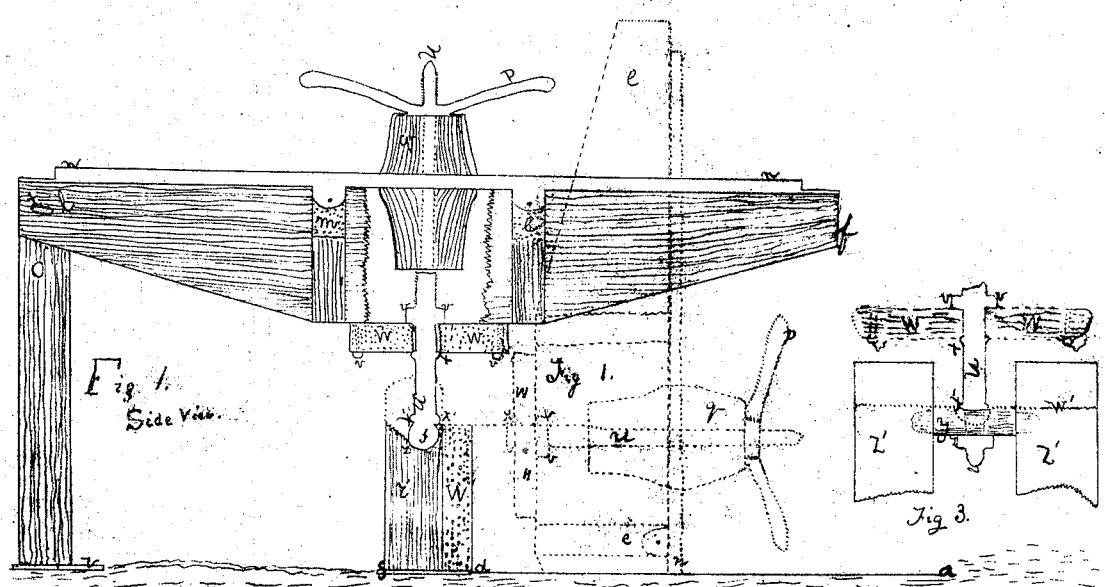
Fig. 1.
Side View.
Fig. 3.

United States Patent Office.

ROBERT B. WHEATLEY, OF GRANDVIEW, INDIANA.

Letters Patent No. 75,713, dated March 17, 1868.

IMPROVED TIRE-SETTING MACHINE.

The Schedule referred to in these Letters Patent and making part of the same.

Specifications of ROBERT B. WHEATLEY's "Revolving Tire-Crab," as set forth in the annexed drawings.

Figure 2 is a top view of the frame $r\,r,\,s\,s,$ which supports the crab $e\,f\,g\,h\,i\,k\,l\,m,$ on which the wheel $n\,n\,n\,n$ rests, and to which it is secured by the wrench $p\,p,$ working on the screw-bolt $u\,u,$ seen more plainly in fig. 1, passing through the hub $q$ upward, and through the iron bolt $y$ downward, as shown in fig. 3. Two arms of the crab $k\,l$ are fastened to the upright posts $o\,o$ by the iron rod $t\,t\,t,$ which passes through them, the posts being provided with shoulders, upon which the arms rest when in a horizontal position, as shown in fig. 1. $a\,b\,c\,d$ is the water-box, into which the wheel is dipped, as shown by the dotted outline drawing, fig. 4, to cool and so shrink the tire upon the wheel.

Figure 1 is a side view, which shows the end of the timber $w\,w,$ the upper surface of which is seen in fig. 1, which is secured to the arms of the crab by bolts, (two of which are marked $v'\,v',$) and through which the screw-bolt $u$ passes. This timber is supported by the bulge $x$ on the bolt $u,$ which is firmly fastened thereto by the nut $v\,v,$ also shown in fig. 3. $w'$ is the end of a piece of timber, which serves as a support for the rod $u,$ when it is given a horizontal position, as shown in the dotted outline, fig. 4, and the upper edge of it is represented in fig. 3 by the dotted line $w'.$ Figure 3 shows a sectional view of the device, which connects the crab with the framework below, and at the same time allows the crab to be revolved in the water-box $a\,d,$ as shown in the perpendicular position already noted in fig. 4. The posts $z'\,z',$ one of which is seen in fig. 1 broken off to show how the screw-bolt $u$ connects with the eye-bolt $y,$ have each a hole to receive the eye-bolt $y,$ so as to allow a free rotary motion. The screw-bolt $u$ passes through the eye-bolt $y,$ on which the bulge $x'$ rests firmly, while the nut $z$ secures the lower end of the screw-bolt $u,$ yet so as to allow it a free rotating motion in the eye-bolt $y,$ while the crab, with the wheel $n\,n\,n\,n$ attached, is being revolved in the water-box $a\,b\,c\,d,$ as shown in fig. 2.

What I claim as new and original, is—

The device of the screw-bolt $u,$ passing through and rotating in the eye-bolt $y,$ which, being firmly fastened to the crab, allows the wheel to be revolved in the water, with the crab for a support, during the process of cooling the tire, and so as to govern completely the dish of the wheel more readily than if the work were performed with the wheel and crab in the usual horizontal position, or if the wheel were left without any support whatever.

Dated this 18th day of January, 1868, Grandview, Indiana.

R. B. WHEATLEY.

Witnesses:
 WEST SATFIELD,
 C. McSTEWART.